June 5, 1934.  R. H. EARLE  1,962,102
VALVE
Filed July 26, 1930   2 Sheets-Sheet 1
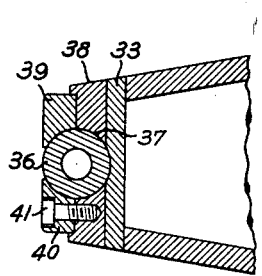
Fig. 6
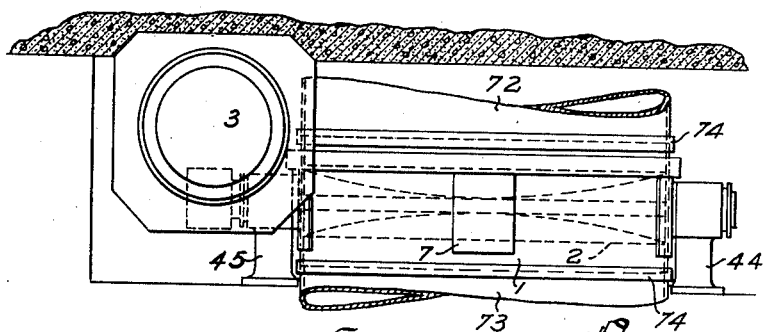
Fig. 3
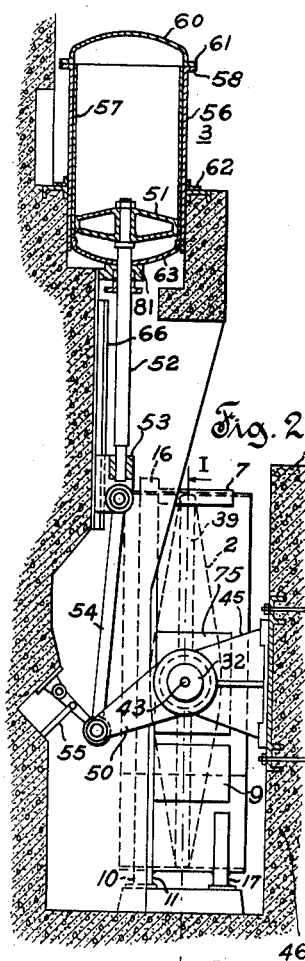
Fig. 2
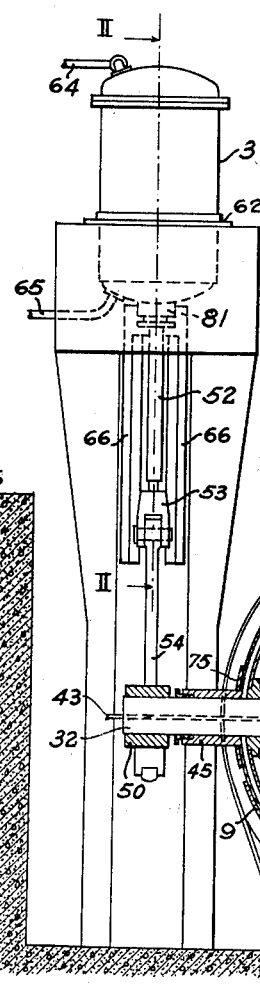
Fig. 1
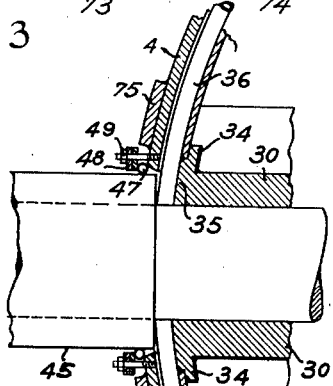
Fig. 5
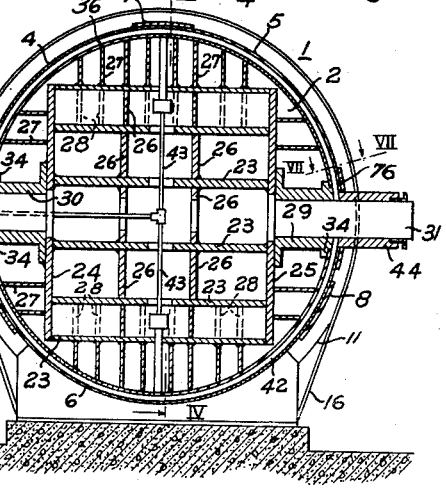
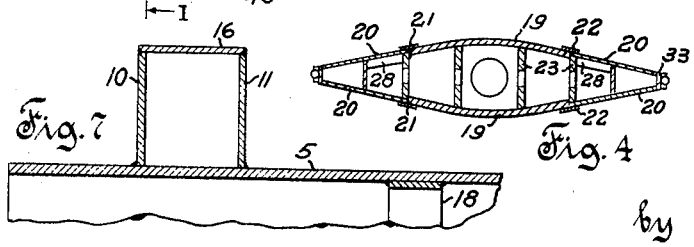
Fig. 7  Fig. 4
Inventor
R. H. Earle
by
Attorney Patented June 5, 1934

1,962,102

UNITED STATES PATENT OFFICE 1,962,102

VALVE

Ralph H. Earle, Wauwatosa, Wis., assignor to Allis-Chalmers Manufacturing Company, Milwaukee, Wis., a corporation of Delaware Application July 26, 1930, Serial No. 470,896

14 Claims. (Cl. 251—11)

This invention relates to improvements in shut off devices for pipe lines and has for its principal object to utilize a cheap building material, such as plate steel, to a large extent in the construction of such devices.

In large installations, such as water power plants, valves of the butterfly type are ordinarily used to control the flow of water through a penstock, and it has heretofore been a common practice to use cast metal, chiefly cast steel, in making the essential parts of these valves, such as the valve housing, the valve wicket and a cylinder for the operating mechanism. As the dimensions of these parts are relatively large, for instance 26 feet for the diameter of the valve wicket, and considerable forces are developed, the castings had to be made correspondingly heavy and their manufacturing costs were high. The invention contemplates constructing these parts in such a manner that, by using plate steel to a large extent, their manufacturing costs compared with those for the castings are relatively low. The fact that the valve is acted upon by considerable forces calls for great strength of the whole structure and it is an object of the invention to adapt the plate construction to this requirement. Stiffening means for the valve housing as well as for the wicket and the operating cylinder are provided to give sufficient strength to these parts.

Another object of the invention is to relieve the valve housing and the adjacent pipe line or penstock from the ordinary thrust forces which are set up by the pressure of the water upon the closure element, when the valve is in closed position.

Another object of the invention is to provide an improved valve mechanism wherein the valve housing and the shaft supporting the closure element, such as the wicket of a butterfly valve, may by subjected to slight displacements relative to each other transversely to the axis of the shaft, and wherein such displacements may take place without causing leakage at the openings of the housing through which the shaft passes. In the improved valve mechanism of this type the bearings for the shaft are preferably mounted outside and independently of the housing so that thrust forces acting upon the shaft in the direction of the longitudinal housing axis may be taken up by means other than the housing.

The provision of means to take up axial thrust forces acting upon the wicket is the subject matter of an application of F. Schmidt, Serial No. 470,907 filed contemporaneously herewith, and the mounting of the bearings outside of the housing as disclosed and specifically claimed herein is a modification of the invention broadly claimed in said copending application.

Another object of the invention is to provide an improved stiffening ring for the plate steel housing of a butterfly valve.

Still another object of the invention is to provide an improved sealing device for a plate steel butterfly valve to prevent leakage when the valve is in its closed position.

Further objects and advantages of the invention will be set forth in the detailed description which follows.

Referring to the drawings:

Fig. 1 is an elevation showing a butterfly valve and an operating mechanism, the valve being shown in section on line I—I of Fig. 2.

Fig. 2 is a side elevation of the valve shown in Fig. 1, the operating mechanism being shown in section on line II—II of Fig. 1.

Fig. 3 is a plan view of the valve and of the operating mechanism shown in Fig. 1.

Fig. 4 is a detail view of the valve wicket and shows a section on line IV—IV of Fig. 1.

Fig. 5 is an enlarged detail view showing in elevation part of the operating shaft and part of a bearing therefor, and in section part of the valve housing and of the wicket.

Fig. 6 is an enlarged detail view of the lefthand end of Fig. 4, showing improved sealing means.

Fig. 7 is an enlarged view of a section on line VII—VII of Fig. 1, showing stiffening rings and a valve seat ring within the housing.

In the embodiment of the invention shown by Figs. 1 to 7 a valve housing 1, a wicket 2, and an operating cylinder 3 are made substantially from sheet metal, and suitable stiffening members are provided to insure sufficient rigidity and strength of these parts.

Figure 9:
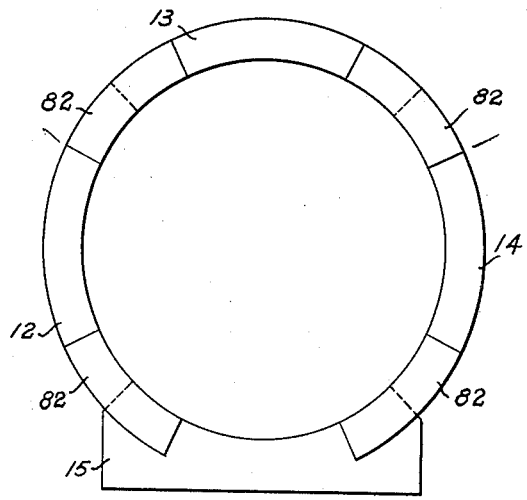
Figs. 8 and 9 are diagrammatic views illustrating an improved method for making a stiffening ring.
Figure 8:
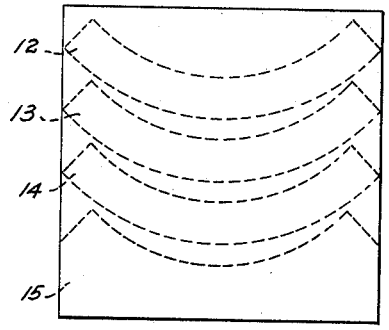

The shell of the valve housing 1 is here shown as being made in three sections 4, 5 and 6, each consisting of a rolled steel plate extending over an arc of about 120°. Butt straps 7, 8 and 9 are placed over the joints and are riveted to the steel plates. On its horizontal diameter the housing 1 is provided with openings in which bearings supporting the wicket 2 are placed in a particular manner which will be described later. When the valve housing is only partly filled with water, for instance to half of its height, there will be a strong tendency of the housing wall to collapse under the downward pressure of the water, and it is necessary, therefore, to provide stiffening means to prevent any such deformation. The rings indicated by 10 and 11 are particularly adapted to serve this purpose. They are composed of several parts cut from a steel plate and their thickness in the direction of the housing axis is equal to the thickness of the plate from which they are made. Their width between the inner and the outer edge is such as to give a suitable moment of resistance. On their lower parts the rings 10 and 11 have projecting portions with a straight edge of suitable length to form a foot adapted to rest on the foundation. This foot and the remaining parts of the ring can be cut from a square steel plate of commercial size with a minimum of scrap material by cutting the plate in the manner illustrated by Fig. 8. As shown in this figure three arc shaped pieces 12, 13 and 14 are cut from a plate, and the remaining part 15 has an arc shaped edge on its upper portion only while its lower portion corresponds substantially to the outline of the plate. Fig. 9 shows the parts 12 to 15 so arranged as to form the stiffening ring, and in this relative position they may be joined together in any suitable manner, preferably by welding. Butt straps 82 may be placed over the joints to insure greater strength of the sectionalized stiffening ring.

If the housing is made in several sections, as shown in Figs. 1 to 3, assembling and disassembling of the housing may be facilitated by providing flange connections instead of the butt strap connections indicated by 7, 8 and 9. In this case the stiffening rings are preferably made in corresponding sections which are fastened to the housing sections and their associated flange members.

Fig. 3 shows a portion of a pipe line 72 connected with the inlet side of the valve, and a portion 73 connected with the outlet side. The adjoining portions of the valve housing and the pipe lines may be connected, as shown, by butt straps 74, or flange connections may be used to facilitate assembling and disassembling of the valve.

The strength of the valve housing 1 is increased by a sheet metal strip 16 which is placed around the stiffening rings 10 and 11 and is preferably welded thereto. Another foot 17 is similar to that formed by the lower portions of the rings 10 and 11 is provided at the opposite end of the housing. On the inner surface of the valve housing a ring 18 is fastened in a position, such that when the valve is closed, the circumferential portions of the wicket 2 will register with the inner surface of the ring, and the sealing means on the wicket will contact with said surface. The ring 18 is preferably made of stainless steel, bronze or other material not subject to corrosion, and permits machining of the seating surface without the necessity of machining the housing throughout its length.

The wicket 2 comprises an outer shell having an up-stream face and a down-stream face formed of plate metal, and stiffening means disposed between the face members. In order to obtain a comparatively sharp edge for splitting the main stream of the water flowing past the wicket when the valve is in its open position the wicket face members are shaped to converge towards each other at both sides of the axis of rotation of the wicket as clearly shown in Fig. 4. The face members are preferably bent as shown, that is, in a direction at right angles to the axis of rotation of the wicket, and they are straight in the direction parallel to said axis. Such bending of the face members in a single direction only will have the advantage that it can be performed with ordinary boiler shop equipment whereas bending the face members in more than one direction would require the use of dies which are objectionable on account of their costs.

Each face member comprises a plate steel section 19 and two wing plates 20. The central section 19 extends transversely across the wicket and covers the main area of the valve cross-section, while the wing plates 20 have the form of segments supplementing the central section to form a circular body. As the wing plates 20 carry a minor part of the load of water pressing against the wicket they are made of thinner material than the central section 19. Butt straps 21 and 22 are placed over the joints between the central section 19 and the wing plates 20 and are secured thereto preferably by welding. The two halves of the wicket shell are spaced apart by a plurality of webs so arranged as to form a number of chambers which are sufficiently small to prevent the plates from being overstressed when subject to the load of the water. The webs are made from plate steel and are welded to both inner surfaces of the wicket shell. Preferably, a number of webs indicated by 23 are arranged parallel to the axis of rotation of the wicket, and the ends of these webs are abutting against two webs 24 and 25 which are disposed at right angles to said axis. By inserting additional webs 26 between the webs 23 the central portion of the wicket is thus divided into rectangular chambers, and the remaining chambers at the circumferential portions are divided by short webs 27 disposed partly parallel with and partly at right angles to the axis of rotation of the wicket. In addition to the webs a number of ribs 28 are provided on that half of the shell which faces the inlet side of the valve when the wicket is turned into its closed position. These ribs do not extend between the inner surfaces of the wicket shell but are shorter and give additional strength to the wing plates which have a tendency to buckle under the load of the water pressing against them. Enclosed between the bent plates 19 are two hubs 29 and 30 which are preferably made of cast steel, and stub shafts 31 and 32 are firmly secured within these hubs. As the stub shafts 31 and 32 have to carry the entire load and a considerable bending moment occurs on the hubs 29 and 30 it is necessary to provide an exceptionally strong connection between these hubs and the main body of the wicket. The webs 24 and 25 offer a suitable means to give sufficient strength to such connection. The inner ends of the hubs 29 and 30 have flanges which are firmly secured to the webs 24 and 25, preferably by welding. In addition, the hubs 29 and 30 are firmly connected with the plates 19, this connection being also preferably made by welding. It will be apparent that by this arrangement the stresses set up at the hubs 29 and 30 are not localized but distributed over the system of interconnected stiffening members and the associated wicket faces.

As has been mentioned before, the connections of the stiffening members within the wicket are preferably made by welding, and this welding work is greatly facilitated by making the wicket in sections, as shown. The central diametrically extending section comprising the plates 19, and the lateral sections comprising the converging wing plates 20 may be assembled independently, shipped to the place of use and afterwards joined together. In cases where the wicket diameter is large, for instance 16 feet or more, there will be room for a welder to work inside the wicket. The bore of the hub portions may in some cases be large enough to allow a man to crawl inside the wicket, but if desired or necessary manholes may be provided at suitable places in the wicket faces.

On its circumference the wicket shell is held together by a band 33 which is fastened on the edges of both halves of the shell. As the wicket has a maximum thickness around the shaft center line and tapers from this portion towards the edges on both sides, as is more clearly shown in Fig. 4, the band 33 is not of uniform width but is shaped to cover both the narrower spaces between the halves of the shell on the edge shaped portions remote from the shaft and the wider spaces between those portions of the shell which are adjacent to the hubs 29 and 30. Each of the hubs 29 and 30 has a shoulder 34 to support the band 33, suitable holes being provided in the latter to receive a projecting portion 35 on each of the hubs.

Attached to the band 33 are sealing means comprising a rubber tube and suitable ring portions to hold the tube in place. The stub shafts 31 and 32 divide the sealing means in two halves, an upper half and a lower half, and both halves are substantially alike. On the upper half, a rubber tube 36 is placed into a semi-circular groove 37 which is cut into a ring portion 38 fastened to the band 33. Ring portions 39 and 40 are held by bolts 41 on either side of the semicircular groove 37 and retain the tube in place, a small area of the outer surface of the tube being left uncovered so that it can be pressed against the inner surface of the seat ring 18 attached to the inner surface of the housing wall. A rubber tube 42 is held on the lower half of the wicket in a similar manner.

The rubber tubes 36 and 42 are connected in any suitable manner with a pipe line 43 through which pressure water is admitted to the interior of the tubes so that their uncovered portions may be deformed to project from the wicket and seal the space between the ring portions 39 and 40, and the inner surface of the valve seat ring 18.

Instead of using two separate rubber tubes 36 and 42 a single continuous rubber tube may be used passing through suitable holes in the stub shafts 31 and 32. The inflated rubber tube may also be replaced by a solid rubber ring or ring portions, in which case the pipe system 43 will not be required.

The stub shafts 31 and 32 are journaled in bearings 44 and 45 which are supported outside of the valve housing on the concrete foundation 46. Axially extended portions of the bearings project into openings in the housing wall and are sealed by means of rubber tubes 47 which are retained by rings 48 adjustably attached to the housing by means of stud bolts 49. It will be apparent that by this arrangement the valve housing is entirely relieved from any forces acting upon the valve wicket as the bearings supporting said wicket, and the housing are mounted independently on the concrete foundation. Adjustment of the wicket to its proper position within the housing is facilitated by making the holes in the housing somewhat larger than the diameter of the bearing portions projecting therethrough.

The valve housing is preferably reinforced where it is weakened by the holes for the wicket shaft. In the construction shown by Figs. 1 to 3 such reinforcement is provided by plates 75 and 76 welded to the housing portions adjacent to said holes.

Figure 10:
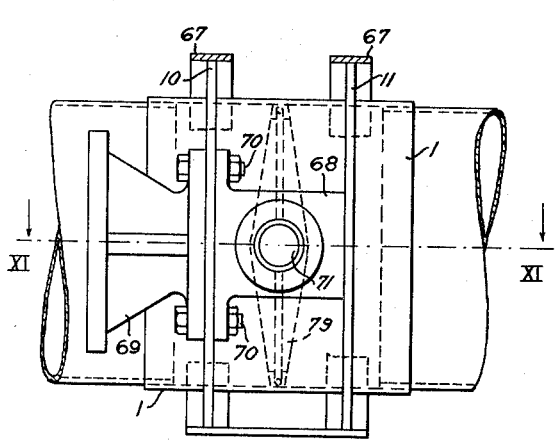
Figs. 10 and 11 show a modified construction of a butterfly valve, Fig. 11 being a section on line XI—XI of Fig. 10.
Figure 11:
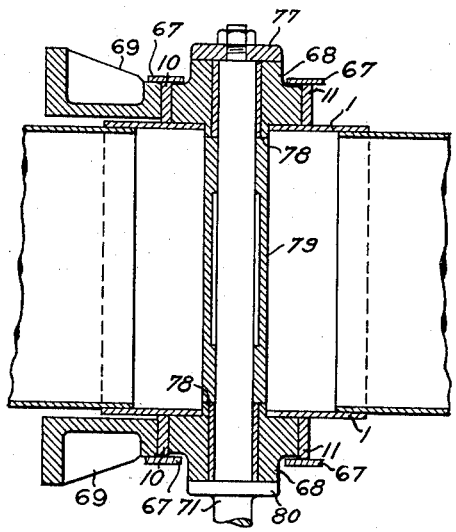

Another method of reinforcing the housing portions adjacent to the holes for the wicket shaft is illustrated by Figs. 10 and 11. The construction here shown also illustrates an improved method of stiffening the housing. The bearings for the wicket are here made in two sections, a head section 68 having substantially the shape of a block welded to the housing, and a pedestal section 69 connected to the block 68 by means of bolts or the like indicated by 70. Interposed between the two bearing sections is a plate metal stiffening ring 10 and a similar stiffening ring 11 embraces the housing 1 in a position such as to line up with the free ends of the head sections 68 which are preferably welded thereto. The stiffening rings 10 and 11 are reinforced by band portions 67 which are welded to the outer edges of the rings. It will be seen that by making the bearings in sections both stiffening rings 10 and 11 can be made alike without the necessity of interrupting one of them at the bearings. It will also be apparent that the blocks 68 welded to the housing offer a suitable reinforcement of the housing shell at those portions where it is weakened by the holes for the wicket shaft.

The stiffness of the valve housing 1 is further increased by using the wicket shaft as a tension member. In order to accomplish this the shaft 71 has a shoulder 80 engaging an outer surface of the head section 68, and a thrust plate 77 cooperating in a similar manner with the opposite head section 68 is associated with the end of said shaft 71. The radial forces set up by the water in the valve housing and acting in the direction of the wicket axis will therefore be taken up by the wicket shaft and the bearings will be prevented from radial displacement. A similar arrangement can of course be provided in cases where stub shafts are used instead of the through shaft 71 shown in Figs. 10 and 11, and broadly termed any kind of rotor disposed in the valve housing may be used as a tension member to prevent radial displacement of the bearings.

The inner ends of the bearing sections 68 project into the housing and have a surface 78 at right angles to the pivoting axis, which cooperates with a corresponding surface provided on the wicket 79. By this arrangement a spherical edge of the wicket portions adjacent to the shaft is avoided, the space between the wicket and the inner surface of the housing wall being sealed by relatively narrow sealing means, as has been described hereinbefore in connection with Fig. 6.

An operating mechanism actuated by pressure water is provided for closing and opening the valve (Figs. 1 and 2). The stub shaft 32 carries on its outer end, remote from the housing, a lever 50 which is moved up and down by a piston 51 connected with the lever by means of a piston rod 52, a cross head 53 and a connecting rod 54. A latch 55 is provided to lock the valve in its closed position.

The cross head 53 moves in a guide 66 which is supported all over its length on the concrete foundation and the guide can, therefore, be of a light construction. The operating cylinder comprises an outer wall 56 which is rolled from plate steel, and a lining 57 rolled from brass plate. A flange 58, preferably made from plate steel, is welded to the outer wall of the cylinder at its upper end and a dished cover 60 with a similar flange 61 is attached by suitable means to the upper end of the cylinder. A stiffening ring 62 is fastened to the outer wall of the cylinder at some point between the upper and the lower end, the purpose of this ring being not only to increase the stiffness of the cylinder but also to support the cylinder on the concrete foundation. The lower end of the cylinder is closed by a dished head 63 which is inserted into the outer cylinder 56 and fastened thereto, preferably by welding. A stuffing box 81 is provided to seal the joint between the cylinder head 63 and the piston rod 52. The upper end of the cross head guide 66 is connected with a bracket on the stuffing box. This connection centers the upper end of the cross head guide with the cylinder and aids greatly in erection since the cross head guide is embedded into the concrete. Pipe lines 64 and 65 are connected with the end covers of the cylinder to admit pressure water to either side of the piston in order to open or close the valve. It has been found that the flange on the upper end of the cylinder, the stiffening ring at the middle portion and the inserted head at the lower end render the cylinder structure rigid enough to allow machining of the brass lining 57 in the usual manner. It is obvious that the manufacturing costs of a cylinder of this type will be considerably less than those for a cylinder of the conventional type, which is made of cast metal.

Various changes may be made in the embodiments of the invention hereinabove described, without departing from or sacrificing any of the advantages of the invention as defined in the appended claims.

It is claimed and desired to secure by Letters Patent:

1. In a valve, a sheet metal housing circumferentially divided into sections, connecting members associated with said sections so as to hold adjoining portions of said sections together, and stiffening means embracing said housing, said stiffening means comprising a plurality of interconnected plate metal members extending in a plane at substantially right angles to the longitudinal axis of said housing.

2. In a valve, a sheet metal housing circumferentially divided into sections, butt straps associated with adjoining portions of said sections and disposed at the outside of said housing, and stiffening means embracing said housing, said stiffening means comprising a plurality of interconnected plate metal members extending in a plane at substantially right angles to the longitudinal axis of said housing and having an inner edge in contact with the outer surface of said housing sections and said butt straps.

3. In a valve, the combination of a housing made of plate metal, a plane plate metal stiffening ring extending at substantially right angles to the longitudinal axis of said housing and having an inner edge in contact therewith, and a separate metal strap secured to the outer edge of said stiffening ring and extending at substantially right angles to the plane of said ring.

4. In a valve, the combination of a housing made of plate metal, a sectionalized plate metal stiffening ring embracing said housing and extending in a plane at substantially right angles to the longitudinal axis thereof, and butt straps associated with adjoining portions of the plate metal sections forming said stiffening ring.

5. In a valve, the combination with a plate metal housing having oppositely disposed wall portions each having a perforation therein, of reinforcing members associated with said perforated wall portions, and a plate metal stiffening ring embracing said housing and extending at substantially right angles to the longitudinal axis thereof, said stiffening ring being disposed in a plane adjacent to said reinforcing members but not intersecting said perforations.

6. In a valve, the combination with a plate metal housing having oppositely disposed wall portions each having a perforation therein, of reinforcing members associated with said perforated wall portions, and plate metal stiffening rings embracing said housing and extending at substantially right angles to the longitudinal axis thereof, said stiffening rings being relatively spaced apart in the direction of said axis, and said reinforcing members being disposed in the space between two of said stiffening rings and secured to the latter.

7. In a butterfly valve, the combination of two plate metal face members forming the up-stream face and the down-stream face, respectively, of the valve wicket and converging towards each other at both sides of the axis of rotation of said wicket, stiffening means for said wicket disposed between said face members, pivoting means disposed between said face members and associated with said stiffening means, and a band-like plate metal member surrounding said face members and secured to the edges thereof so as to hold them together, the width of said band-like member varying according to the spacing of said edges.

8. In a butterfly valve, the combination of two plate metal face members forming the up-stream face and the down-stream face, respectively, of the valve wicket and converging towards each other at both sides of the axis of rotation of said wicket, stiffening means for said wicket disposed between said face members, a band-like plate metal member surrounding said face members and secured to the edges thereof so as to hold them together, a sealing element associated with said band-like member, and retaining means for said sealing element secured to said band-like member.

9. In combination, a valve housing having oppositely disposed apertures, a closure element within said housing, axially alined journal portions associated with said closure element and extending through said apertures, a bearing for each of said journal portions, a supporting structure for retaining said bearings and housing, respectively, in relatively fixed positions independently of each other, and flexible sealing means for said apertures adapted to accommodate slight relative displacements between the axis of said journal portions and said housing in a direction transversely to said axis.

10. In combination, a valve housing having oppositely disposed apertures, a closure element within said housing, journal portions associated with said closure element and extending through said apertures, a bearing for each of said journal portions, each of said bearings having a portion projecting into one of said apertures, a supporting structure for retaining said bearings and housing, respectively, in relatively fixed positions independently of each other, and flexible sealing means associated with each of said bearing portions and said housing for sealing said apertures, said sealing means being adapted to accommodate slight relative displacements between said bearings and said housing in a direction transversely to the axes of said bearings.

11. In a valve, the combination of a housing made of plate metal, a plane plate metal stiffening ring extending at substantially right angles to the longitudinal axis of said housing, and a separate metal strap secured to said stiffening ring and extending therefrom at substantially right angles to the plane of said ring.

12. In a valve, the combination of a plate metal housing, a rotary element disposed within said housing and having an axis of rotation substantially at right angles to the longitudinal axis of said housing, pivoting means associated with said rotary element and projecting through the wall of said housing, and means associated with said housing and said pivoting means, whereby forces acting upon the inner surface of said housing are transmitted upon said pivoting means so as to prevent said housing from spreading in the direction of the axis of said pivoting means.

13. In combination, a butterfly valve housing having an aperture, a wicket having a journal portion extending through said aperture, a bearing for said journal portion, a supporting structure for retaining said bearing and housing in relatively fixed positions independently of each other, and flexible sealing means for said aperture adapted to accommodate slight relative displacements between the axis of said journal portion and said housing in a direction transversely to said axis.

14. In combination, a butterfly valve housing having an aperture, a wicket having a journal portion extending through said aperture, a bearing for said journal portion, a supporting structure for retaining said bearing and housing in relatively fixed positions independently of each other, and flexible sealing means associated with said bearing and said housing for sealing said aperture, said sealing means being adapted to accommodate slight relative displacements between said bearing and said housing in a direction transversely to the axis of said bearing.

RALPH H. EARLE.